Sept. 29, 1959  W. U. HISER  2,906,546
TRACTOR HITCH OR THE LIKE
Filed March 6, 1958

INVENTOR.
WILLARD U. HISER
BY *M. Ralph Shaffer*
HIS ATTORNEY

United States Patent Office 2,906,546
Patented Sept. 29, 1959

2,906,546

TRACTOR HITCH OR THE LIKE

Willard U. Hiser, Douglas, Wyo., assignor of one-third to Henry A. Anderson, Salt Lake City, Utah, and one-third to Clive D. Anderson, Douglas, Wyo.

Application March 6, 1958, Serial No. 719,660

4 Claims. (Cl. 280—482)

This invention is related to tractor hitches, and more particularly to a new and improved tractor hitch which supplants the conventional drawbar and allows the farm equipment coupled to the tractor to be turned within an unusually short turn radius when the tractor is in motion.

Present-day farm tractors are generally provided with a linkage (such as the widely used triangular or three-point linkage) for mount-type implements, and use a drawbar to accommodate pull-type implements such as balers. Normally associated with the mount-type implement linkage is a hydraulic lift mechanism. This mechanism is not operatively associated, generally, with the drawbar apparatus provided for coupling pull-type implements to the associated tractor.

The present invention utilizes the hydraulic lift mechanism of the tractor to actuate novel drawbar-hitch so as to enable farm implements of the pull-type to be turned within an extremely short turn radius.

An object of the present invention is to provide a novel drawbar-hitch for employment with farm tractors.

Another object of the present invention is to provide a novel tractor hitch which will enable pull-type farm implements attached thereto to be turned in an extremely short turn radius.

According to the present invention, a farm tractor with which the hitch is to be employed is provided with an anchor pin generally spring loaded, and preferably disposed in vertical disposition immediately beneath the differential housing of the tractor and attached thereto. The hitch is movable in a vertical plane and has two knuckle joints proximately disposed with the opposite extremities thereof. The knuckle joints are preferably disposed horizontally. The pull-type farm implement or implements which are to be drawn by the tractor generally are equipped with a respective, vertically oriented anchor pin and associated clevis. Accordingly, the hitch knuckle joint disposed nearest the anchor pin of the tractor permits the main body of the hitch to be rotationally displayed in a vertical plane about the horizontal axis of the knuckle. In turn, the hitch knuckle joint disposed nearest the anchor pin of the attached farm implement, together with the cooperation of the anchor pin of the farm implement, serves as a universal joint of wide range effectiveness.

The hitch itself is bolted or otherwise affixed to the crossbar generally situated between the lift arms of the tractor's hydraulic lift mechanism. Two chain lengths or a pair of extensible and retractable brace bars (see U.S. Patent 2,462,726) are included in the triangular hitch and intercouple the respective ends of the crossbar to the top link of the tractor normally disposed above the differential housing thereof.

In operation, the body or length of the hitch may, at the will of the operator, be angularly elevated or lowered with respect to the horizontal. An effectual universal joint exists by virtue of the hitch knuckle joint and the anchor pin of the associated farm implement, at that point at which the implement is coupled to the hitch. On causing the tractor to progress in a tight turn, the operator may simultaneously activate the hydraulic lift mechanism, thereby elevating the tractor hitch with respect to the horizontal, so as to aid the aforementioned universal joint in permitting the attached farm implement to be turned also within a short turn radius.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
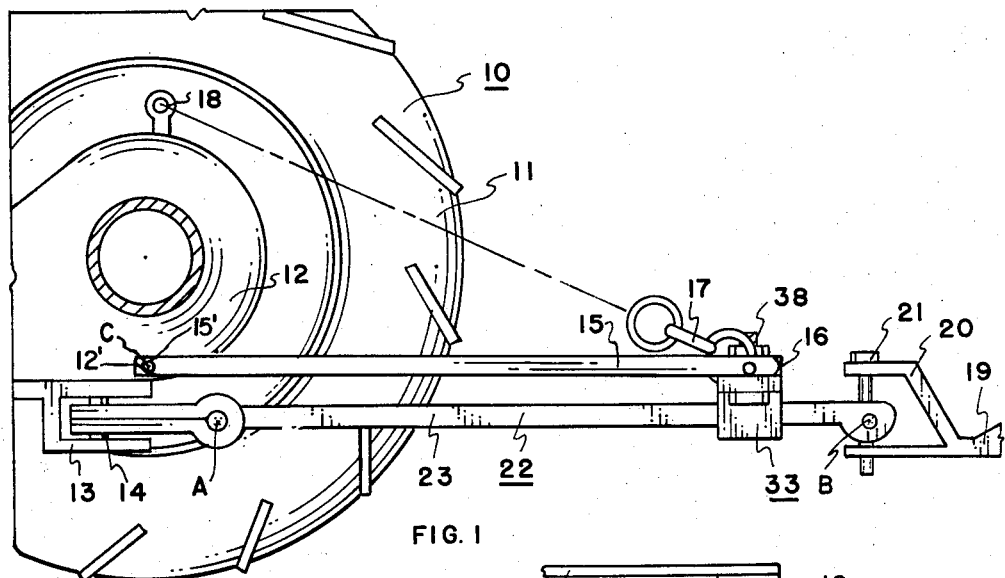
Figure 1 is a fragmentary side elevation of a farm tractor (facing toward the left of the viewer) with the left-rear tractor wheel removed for purposes of clarity to show the novel hitch of the present invention and its attachment to the tractor and to the farm implement to be drawn or pulled thereby.

In Figure 1, tractor 10 includes tractor wheel 11 and differential housing 12. Some makes of tractors include a clevis attachment 13 which is affixed to the under side of the differential housing by means of a plurality of stud bolts (not shown). This clevis attachment conventionally includes a spring-loaded anchor pin 14. It will, of course, be understood that if the particular make of tractor is not already provided with a clevis attachment 13 or other pin connection similar to anchor pin 14, a suitable attachment may easily be obtained on the open market and appropriate provision made for its attachment to the under side of the differential housing.

The conventional lift arms 15 are each connected at one end thereof to opposite sides, respectively, of the lowermost region of differential housing 12 by a respective pivot pin 12′ (see Figure 1), the latter being affixed to the differential housing in a conventional manner and passing through pivot aperture 15′ of the respective lift arm. The remaining ends of the lift arms 15 are connected to opposite ends of crossbar 16, with intermediate points of the lift arms being mechanically coupled to the hydraulic lift mechanism (not shown) of the tractor so as to accomplish, when actuated thereby, the arcuate, upward and forward translation of the crossbar 16, which crossbar motion is conventional. (See U.S. Patent 2,462,726 for an illustration of the hydraulic mechanism and its connection to the lift arms, wherein the conventional and conventionally pivoted lift arms are designated as "rearwardly extended diverging arms.") The tractor apparatus includes two lengths of chain 17 (or a pair of extensible and retractable, slide-type brace bars—see U.S. Patent 2,462,726) which connect opposite ends of the crossbar 16 to top link 18 affixed to the top of the differential housing 12. These chains or brace bars support the crossbar and the lift arms at the crossbar's lowermost point of travel.

Implement 19 (to be drawn) includes clevis 20 and anchor pin 21 as shown.

The device which is the subject of the present invention is termed a drawbar-hitch 22 and is composed of: principal member 23 (including pins 29 and 30), attachment member 24, knuckle 25, and slide member 33. Principal member 23 is coupled to attachment member 24 by means of knuckle portions 26, 27 and 28 and by the positioning therethrough of the principal member's pivot pin 29. The remaining pivot pin 30 (in either one or two portions) rotationally couples knuckle 25 to clevis portion 31 of principal member 23.

Figure 2:
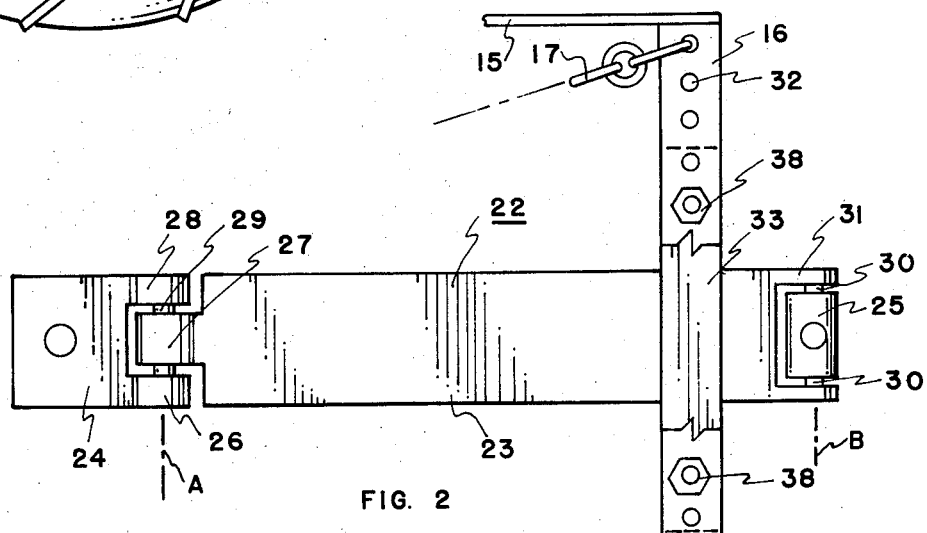
Figure 2 is a plan view of the hitch of the present invention, with the crossbar and lift arms of the hydraulic mechanism shown in fragmentary view.

Thus, it is seen with reference to Figure 2, particularly, that knuckle joints are present in the drawbar-hitch construction at opposite extremities of the hitch. Both pivot axes of the knuckle joints are parallel to each other and to the horizontal.

It will be understood that crossbar 16, operatively associated with the hydraulic lift mechanism, is raised or lowered along an upper, forward arc in accordance with the actuation of the hydraulic lift mechanism. The crossbar 16 is quite generally provided with a plurality of apertures 32. These apertures 32 may easily serve as mounting apertures to accommodate the mounting to the crossbar of member 33 (see Figure 3).

Figure 3:
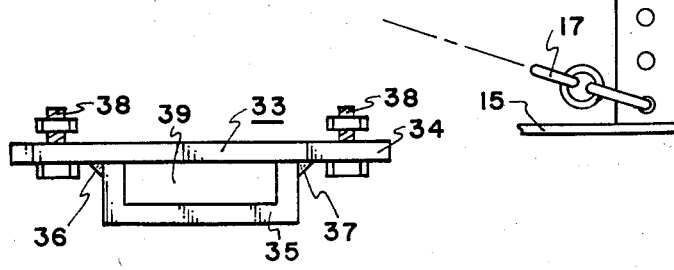
Figure 3 is a front elevation of that member of the hitch which serves to intercouple the hitch with the aforementioned crossbar.

In Figure 3, member 33 includes a principal bar member 34, a U-shaped member 35 welded thereto at points 36 and 37, and mounting attachments 38. It will be noted that the design of member 33 includes an aperture 39, which aperture is formed upon the joining of U-shaped member 35 to principal member 34. Aperture 39 permits member 33 to slide along the length of principal member 23 in accordance with the elevation, with respect to the horizontal, of the hitch.

The operation of the apparatus above described is as follows. The cooperation of the knuckle connection or joint (including clevis portion 31, pivot pin 30, and knuckle 25) with the pivot pin 21 results in the establishment of a universal joint at that point at which the farm implement 19 is attached to the hitch. Correspondingly, there exists a hinge or knuckle connection in the drawbar-hitch 23 immediately to the rear of anchor pin 14 of the tractor. The horizontal, parallel, pivot axes of the knuckle connections are designated by dots A and B, whereas dot C represents the pivot axis of the lift arms 15 which is also horizontal and parallel to the knuckle connection pivot axes. On elevating the crossbar 16 with the hydraulic lift mechanism (by the same rotationally displacing the pivoted lift arms 15 in a counter-clockwise direction about axis C, see U.S. Patent 2,462,726), the principal member 23 of drawbar-hitch 22 is caused to rotate about pin 29 (axis A) in a counter-clockwise direction, sliding within aperture 39 associated with member 33 so as to compensate for possible separation in the pivot axes C and A of the lift arms 15 and principal member 23. As the principal member 23 of drawbar-hitch 22 is being elevated relative to the horizontal, the front portion of farm implement 19 will be raised increasingly with respect to the ground and drawn forwardly so as to shorten the effective (horizontal) distance between the wheels of the implement and the turn center of the tractor. (During this process the knuckle 25 of course will be rotationally displaced about axis B so as to accommodate the new angular disposition of anchor pin 21 of the attached implement.) Hence, when the tractor is turned by the operator in a short turn radius, the farm implement will proceed in a corresponding manner.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true sprit and scope of this invention.

I claim:

1. For employment with a farm tractor having a hydraulic lift mechanism including a pair of rearwardly extending and horizontally pivoted lift arms and a crossbar interposed therebetween and coupled thereto: a hitch pivotally movable in a vertical plane in accordance with the vertical, pivotal displacement of said lift arms, said hitch comprising, in combination: an elongate principal member; an attachment member cooperating with one end of said principal member in a first knuckle joint, said attachment member having a pivot aperture and being pivotally mountable thereby to said tractor; a knuckle member cooperating with the remaining end of said principal member in a second knuckle joint, said knuckle member having a mounting aperture adapted to accommodate the rotatable placement therewithin of the anchor pin of a farm implement to be coupled to said hitch, and the pivot axes of said knuckle joints being horizontal and parallel with each other and with the pivot axis of said lift arms; and means affixed to said crossbar for slideably receiving said principal member, thereby permitting said principal member to adjust longitudinally, its disposition with said crossbar during intervals of vertical, pivotal displacement of said principal member and said lift arms so as to compensate for the possible non-coincidence of the axes of said lift arms and said first knuckle joint.

2. Apparatus according to claim 1 in which said means is provided with an aperture, said principal member of said hitch being slideably disposed through said means aperture.

3. Apparatus according to claim 2 in which said crossbar is provided with a plurality of vertical apertures, and in which said means is supplied with attachments for fixedly connecting said means to said crossbar.

4. Apparatus according to claim 3 in which said means comprises: a principal bar mounted directly against and underneath said crossbar by said attachments, and a depending U-shaped member integral with said principal bar and defining therewith said means aperture.

References Cited in the file of this patent

UNITED STATES PATENTS

| 1,939,950 | Brown | Dec. 19, 1933 |
| 1,941,013 | Lindgren | Dec. 26, 1933 |
| 2,462,726 | Currie | Feb. 22, 1949 |
| 2,757,019 | Anderson | July 31, 1956 |

FOREIGN PATENTS

| 219,086 | Great Britain | July 18, 1924 |